US 6,582,313 B2

(12) United States Patent
Perrow

(10) Patent No.: US 6,582,313 B2
(45) Date of Patent: Jun. 24, 2003

(54) CONSTANT VELOCITY STROKING JOINT HAVING RECIRCULATING SPLINE BALLS

(75) Inventor: Scott Jay Perrow, Freeland, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/747,785

(22) Filed: Dec. 22, 2000

(65) Prior Publication Data

US 2003/0073503 A1 Apr. 17, 2003

(51) Int. Cl.[7] .............................................. F16D 3/224
(52) U.S. Cl. ....................................... 464/145; 464/168
(58) Field of Search ................................. 464/121, 145, 464/146, 167, 168, 906, 158, 159; 384/43, 44, 45, 49; 180/384, 385

(56) References Cited

U.S. PATENT DOCUMENTS

| | | | | |
|---|---|---|---|---|
| 1,094,603 A | * | 4/1914 | Scott | 464/158 |
| 1,362,652 A | * | 12/1920 | Tucker | 464/158 |
| 1,665,280 A | * | 4/1928 | Rzeppa | 464/145 |
| 2,979,147 A | * | 4/1961 | Naumann | 384/44 X |
| 3,310,960 A | * | 3/1967 | Cull | 464/145 |
| 3,353,876 A | * | 11/1967 | Moyer | 384/43 |
| 5,061,223 A | * | 10/1991 | Kadota et al. | 464/168 X |
| 5,230,567 A | * | 7/1993 | Takeuchi | 384/43 |
| 6,251,021 B1 | * | 6/2001 | Jacob | 464/906 X |

FOREIGN PATENT DOCUMENTS

GB 148251 * 8/1921 .................. 464/158

OTHER PUBLICATIONS

SAE Universal Joint and Driveshaft Design Manual, Advances in Engineering Series No. 7, Warrendale, PA, The Society of Automotive Engineers, Inc., pp. 193 & 194, TJ1079.S62 1979.*

* cited by examiner

Primary Examiner—Greg Binda
(74) Attorney, Agent, or Firm—Edmund P. Anderson

(57) ABSTRACT

A constant velocity stroking joint includes an inner race mounted to a shaft and accommodated for angular pivotal movement within an intermediate race to provide angulation to the joint assembly. The intermediate race is disposed within an outer race and a plurality of recirculating ball spline tracks is formed therebetween and accommodated in a plurality of spline balls. The endless tracks support the spline balls for free rolling, recirculating movement during axial stroking of the intermediate race within the outer race through its full range of axial stroke.

9 Claims, 5 Drawing Sheets

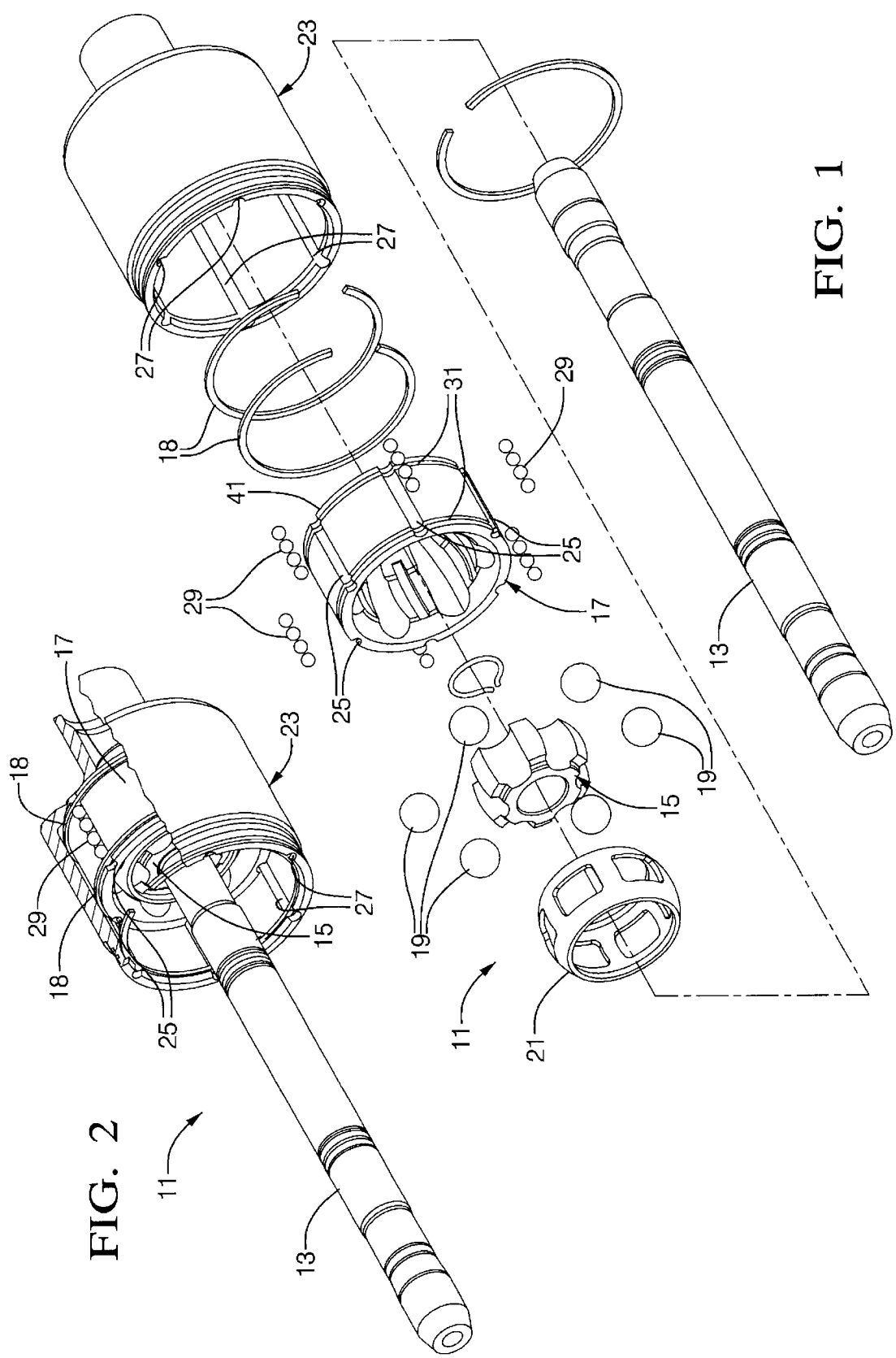

CONSTANT VELOCITY STROKING JOINT HAVING RECIRCULATING SPLINE BALLS

BACKGROUND OF THE INVENTION

1. Technical Field

This invention relates generally to constant velocity joints and more particularly to those which angulate and stroke in the axial direction of the joint.

2. Related Art

Constant velocity ("CV") stroking joints are used in front wheel drive systems for automotive vehicles. Power is transmitted from the transmission to the drive wheels via half shaft assemblies. The shaft assemblies include CV joints at their inboard and outboard ends. The inboard CV joint is coupled to the transmission and the outboard CV joint is coupled to the drive wheels. During operation, the drive wheels move up and down and thus provision must be made for both angular and axial movement of the shaft assemblies.

FIGS. 1 and 2 illustrate a well known Rzeppa-type stroking constant velocity joint shown generally at 11. The joint 11 includes a half shaft 13 on which an inner race 15 is mounted. The inner race 15 is accommodated within an intermediate race 17. The races 15,17 are formed with a series of axially aligned curved ball grooves in which balls 19 are accommodated and restrained axially by a ball cage 21 to provide for angular pivotal movement of the inner race 15 relative to the intermediate race 17.

The intermediate race 17 is, in turn, accommodated within an outer race 23. The races 17,23 are formed with aligned axial ball channels 25,27 in which rows of ball splines 29 are received for supporting the intermediate race 17 for relative axial stroking movements relative to the outer race 23. The intermediate race 17 is fitted at its axial ends with a pair of retaining rings 18 which extend across the ball grooves to restrain the spline balls 19 against movement beyond the retaining rings 18. In operation, the intermediate race 17 is provided with a certain amount of free rolling axial stroke over which the spline balls 19 roll freely within the ball channels of the intermediate race 17. Additional axial travel of the intermediate race 17 between end stops of the outer race 23 is permitted beyond the range of free roll movement, but requires the spline balls 19 to skid or slide without rolling action along the ball channels once they confront one or the other retaining rings 18 carried on the ends of the intermediate race 17.

It is an object of the present invention to improve upon the construction and performance of such constant velocity stroking joints.

SUMMARY OF THE INVENTION

A constant velocity stroking joint assembly constructed according to a presently preferred embodiment of the invention includes an inner race, and outer race, and an intermediate race disposed between the inner and outer races which supports the inner race for angular pivotal movement relative to the outer race. At least one recirculating ball spline track is provided between the intermediate race and outer race in which a plurality of spline balls are accommodated for recirculating rolling movement in an endless path along the track to support the intermediate race for axial stroking movement relative to the outer race.

The invention has the advantage of providing a recirculating ball spline support system for the intermediate race that enables axial stroking of the intermediate race within the outer race while the free rolling spline balls circulate along the endless path of the track so as to minimize or all together eliminate the necessity for the skidding or sliding of the spline balls in order for full axial stroking of the intermediate race to take place.

The free rolling, recirculating action of the spline balls has a further advantage of decreasing the resistance to axial stroking of the intermediate race, thereby providing a smoother operating, lower noise and vibration constant velocity joint compared to joints where the ball splines skid or slide over a portion of the axial stroking of the intermediate race.

The invention has the further advantage of prolonging the operating life of such constant velocity stroking joints by minimizing or all together eliminating the skidding or sliding of the spline balls along the ball tracks. The free rolling action of the spline balls in the endless recirculating track eliminates skidding and thus wear on the balls and track.

BRIEF DESCRIPTION OF THE DRAWINGS

These and other features and advantages of the present invention will become more readily appreciated when considered in connection with the following detailed description and appended drawings, wherein:

FIG. 1 is an exploded perspective view of a prior art joint assembly;

FIG. 2 is an enlarged perspective view, shown partly in section, of the assembled prior art joint of FIG. 1;

DETAILED DESCRIPTION OF THE PREFERRED EMBODIMENT

Figure 3:
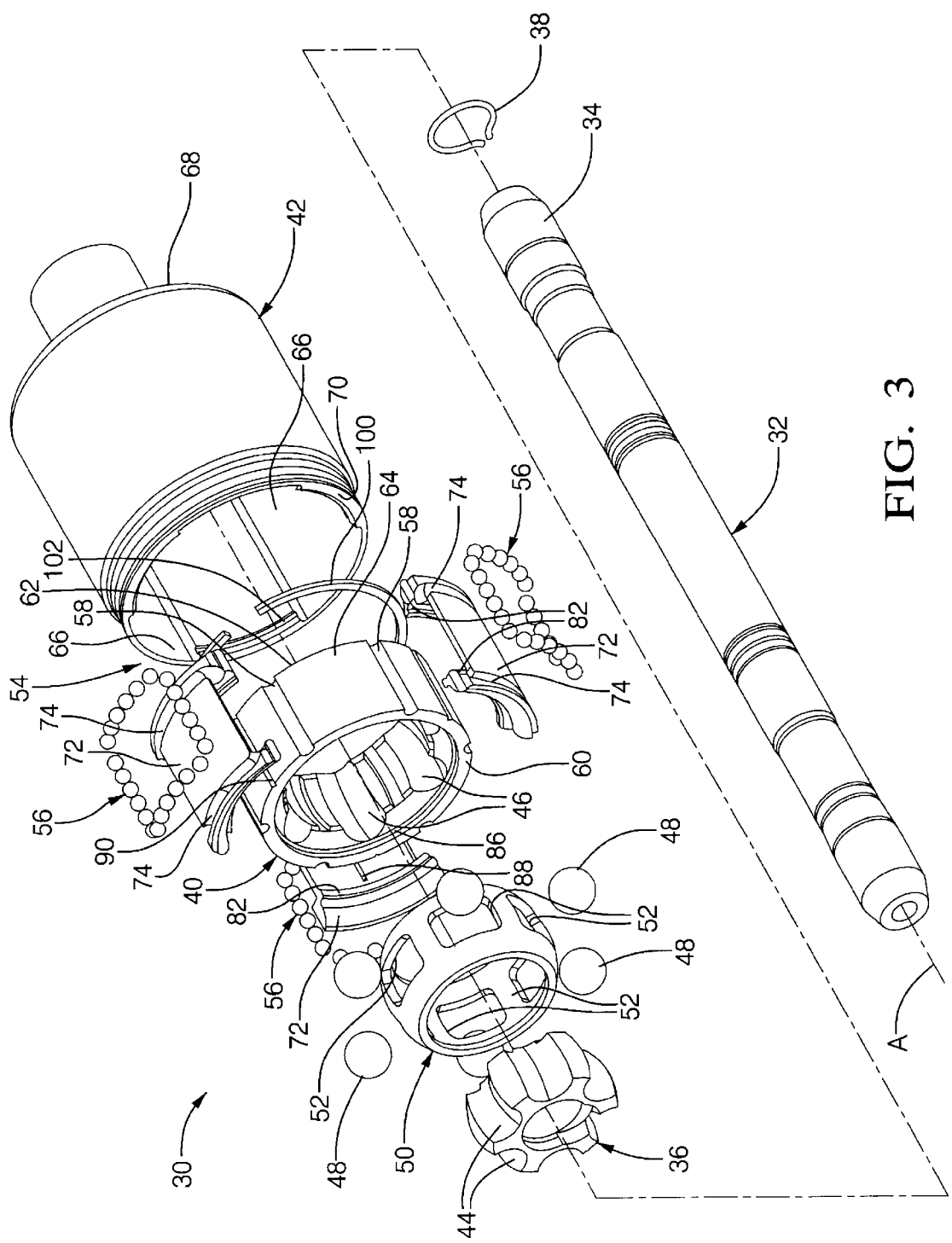
FIG. 3 is an exploded perspective view of a joint constructed according to a presently preferred embodiment of the invention.
Figure 4:
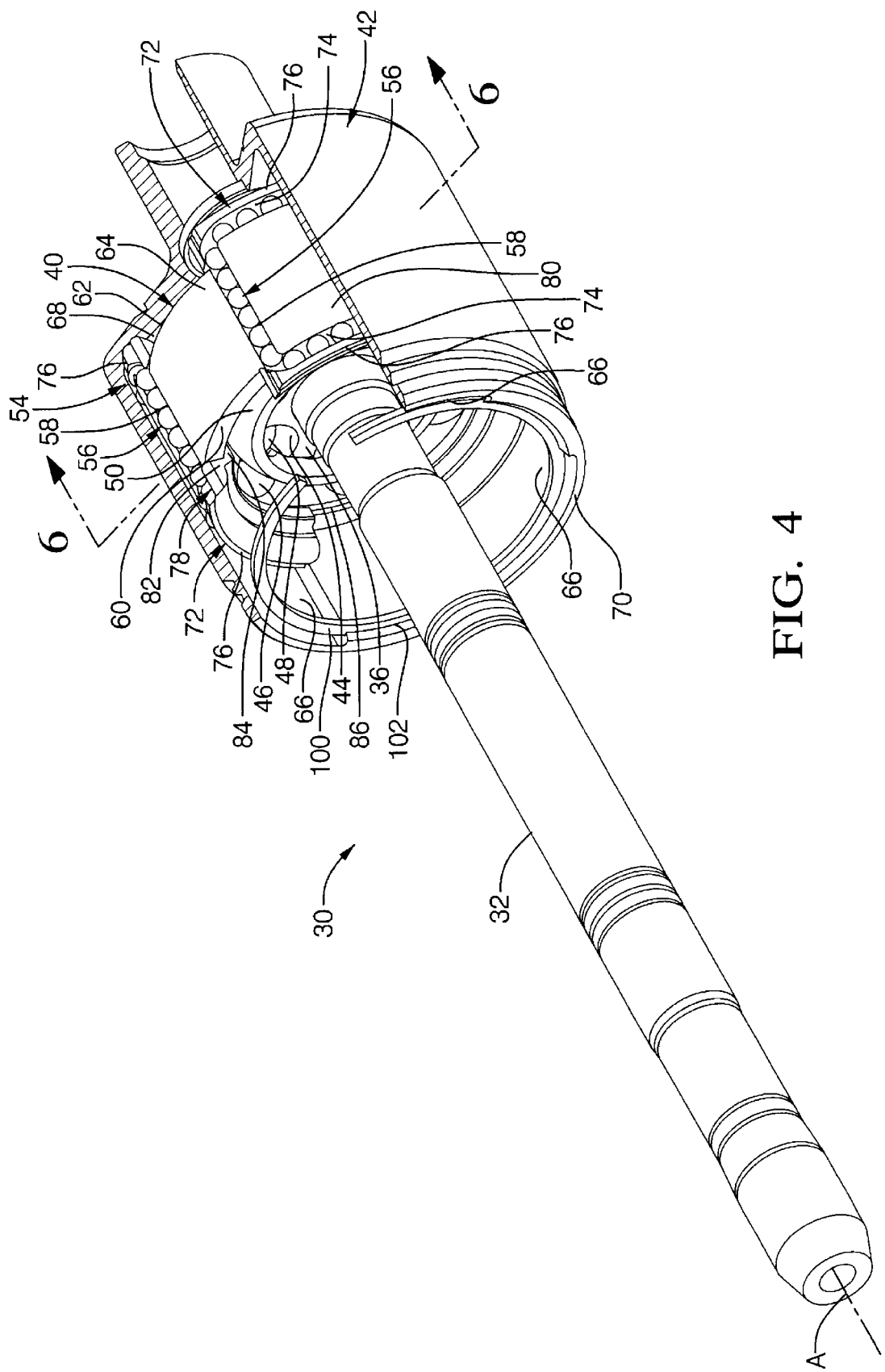
FIG. 4 is an enlarged perspective view, shown partly in section, of the assembled joint of FIG. 3.

A Rzeppa-type constant velocity stroking joint constructed according to a presently preferred embodiment of the invention is shown generally at 30 in FIGS. 3 and 4 and comprises a rigid half shaft 32 having a splined end 34 on which an internally splined inner race 36 is mounted and retained by snap ring 38. The inner race 36 is received within an intermediate race 40 which in turn is received within an outer race 42.

The outer surface of the inner race 36 and the inner surface of the intermediate race 40 are formed with a plurality of circumferentially spaced, axially extending curved ball grooves 44,46 which are aligned to define axial ball channels in which a plurality of torque-transmitting balls 48 are received, with one ball being disposed in each set of aligned ball grooves.

A ball cage 50 is disposed between the inner race 37 and intermediate race 40 and is formed with windows 52 in which the balls 48 are accommodated. The ball cage 50 has inner and outer curved surfaces which cooperate with spherical surfaces of the inner and intermediate races 38,40 in such manner that the inner race 36 and thus the shaft 32 is supported by the intermediate race 40 for angular pivotal movement relative to the intermediate race 40 and outer race 42 in well known manner.

In addition to angular movement of the joint assembly 30, the joint assembly 30 also provides for relative axial displacement or plunging movement of the shaft 32 relative to the outer race 42 in the manner to be described below.

The assembly 30 is provided with at least one and preferably a plurality of recirculating ball spline tracks 54 provided between the intermediate race 40 and outer race 42 each having a plurality of spline balls 56 accommodated therein for recirculating rolling movement in an endless path along the track 54 for supporting the intermediate race 40 for axial stroking movement relative to the outer race 42.

The ball spline tracks 54 preferably include a plurality of ball channels 58 formed in the outer surface of the intermediate race 40 and extending axially in the direction of a longitudinal axis A of the assembly 30 between axially opposite ends 60,62 of the intermediate race 40. The ball channels 58 are spaced circumferentially from one another by intervening land regions 64.

The outer race 42 is formed on its inner surface with a plurality of ball channels 66 extending axially in the direction of longitudinal axis A between an end wall 68 at one end of the outer race 42 and an opposite open end 70. For reasons which will become more apparent below, the ball channels 66 have a width considerably greater than the ball channels 58 of the intermediate race 40. Each ball channel pair of corresponding ball channels 58 of the intermediate race 40, such that there are twice as many ball channel 58 provided in the intermediate race 40 as ball channels 66 in the outer race 42.

Each endless ball spline track 54 includes a pair of axial runs which are preferably provided by adjacent pairs of ball channels 58 of the intermediate groove and axial walls of an associated aligned ball channel 66 of the outer race 42.

The recirculating ball spline tracks 54 preferably include channel extender members 72 providing transverse ball channels 74 extending transversely between and interconnecting the ends of the axial ball channels 58 formed in the intermediate race 40 to define the endless path of movement for the recirculating spline balls 56.

Figure 5:
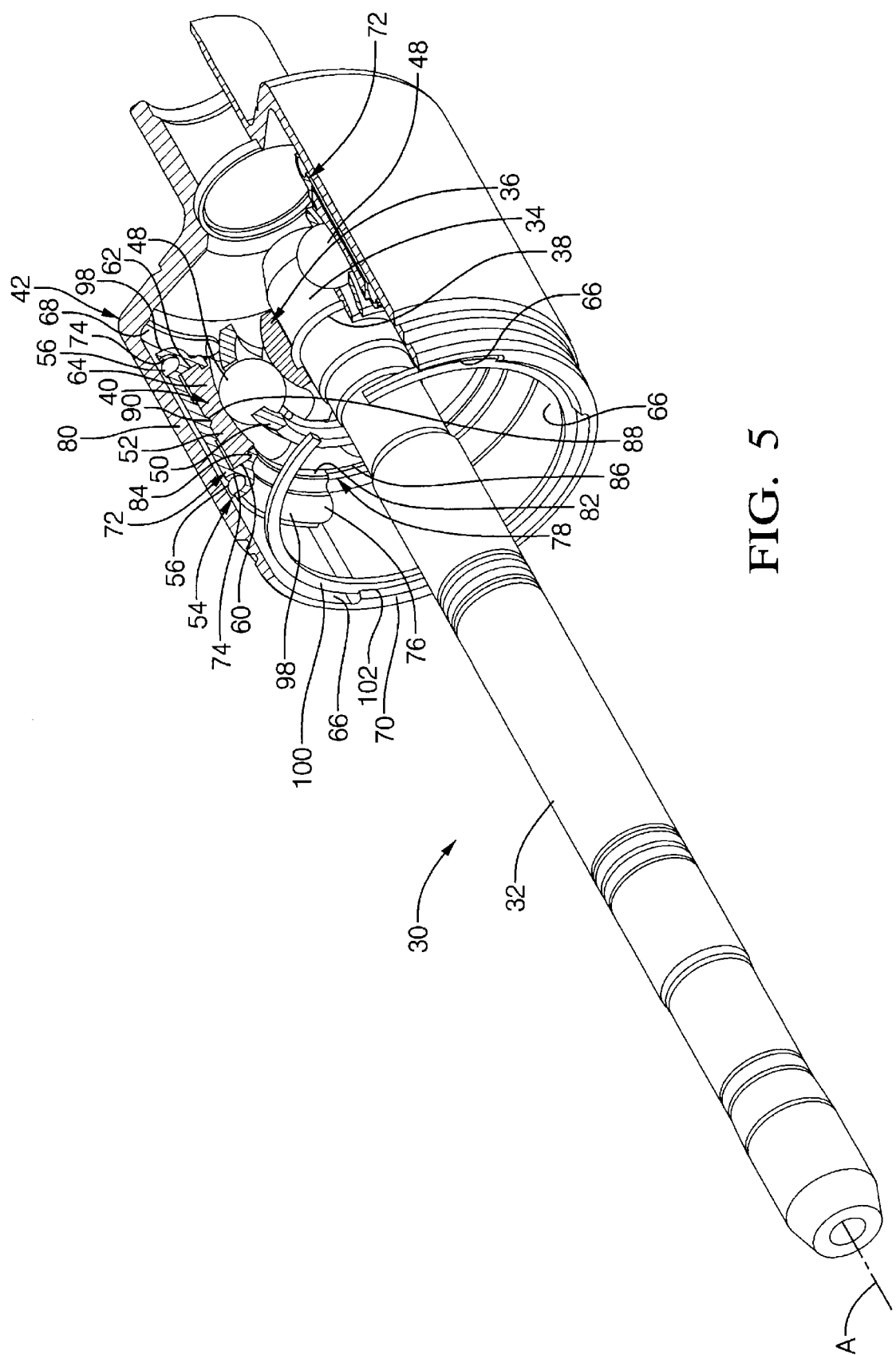
FIG. 5 is an enlarged perspective view, shown partly in section, of the joint assembly of FIG. 3.

The channel extenders 72 include channel portions 76 which project beyond the ends 60,62 of the intermediate race 40 and are formed with the transverse ball channels 74. The axially extended channel portions 76 are coupled to the intermediate race 40 preferably with a snap-lock connection 78. As shown best in FIG. 7, the channel portions 76 of each channel extenders 72 are spaced axially from one another and are joined by a body portion 80 which extends between and interconnects the channel portions 76. As shown best in FIGS. 4–6, the body portion 80 overlies the land region 64 of the intermediate race 40 between adjacent ball channels 58. The channel portions 76 are formed with a flange 82 that wraps around and extends beneath the ends 60,62 of the intermediate race 40 and includes a circumferential projection or rib 84 that fits within annular grooves 86 formed in the inner ends of the intermediate race 40 to provide the snap-lock connection 78 between the channel extenders 72 and the intermediate race 40.

To mount the channel extenders 72 on the intermediate race 40, the body portions 40 are positioned over the land region 64 and the flanges 82 are forced over the ends 60,62 of the intermediate race, whereupon they flex outwardly to permit the passage of the flanges 82 pass the ends 60,62, and then return resiliently inwardly to locate the ribs 84 within the retaining grooves 86 to lock the channel extenders 72 to the intermediate race 40. As shown best in FIGS. 3, 6 and 7, the body portion 80 of the channel extenders 72 is preferably formed on its underside with an axially extending alignment rib 88 that is received in an axially extending alignment groove 90 of the intermediate race 40 for securing the channel extenders 72 in proper alignment with respect to the ball channels 58 of the intermediate race 40. The channel extenders 72 may be molded of a rigid plastics material which is sufficiently elastically deformable to enable the channel extenders 72 to be snap-locked onto the intermediate race 40 in the manner described or any other manner that would attain a snap-lock connection, or the channel extender 72 may alternatively be formed of a resilient metal material, such as spring steel or the like which would be suitable as a ball track yet sufficiently resilient to accommodate snap-lock connection to the intermediate race 40.

In operation, the endless ball spline tracks 54 defined in part by the aligned ball channels 58,66 of the intermediate race 40 and outer race 42, respectively, and the channel extenders 72 define an endless path for free rolling movement of the spline balls 56 during axial stroking of the intermediate race 40 within the outer race 42 when the joint assembly 30 is under a torque load in either one direction or the other (i.e., clockwise or counterclockwise with respect to the rotational torque load applied to the intermediate race 40) which would tend to rotate it relative to the outer race 42.

Figure 6:
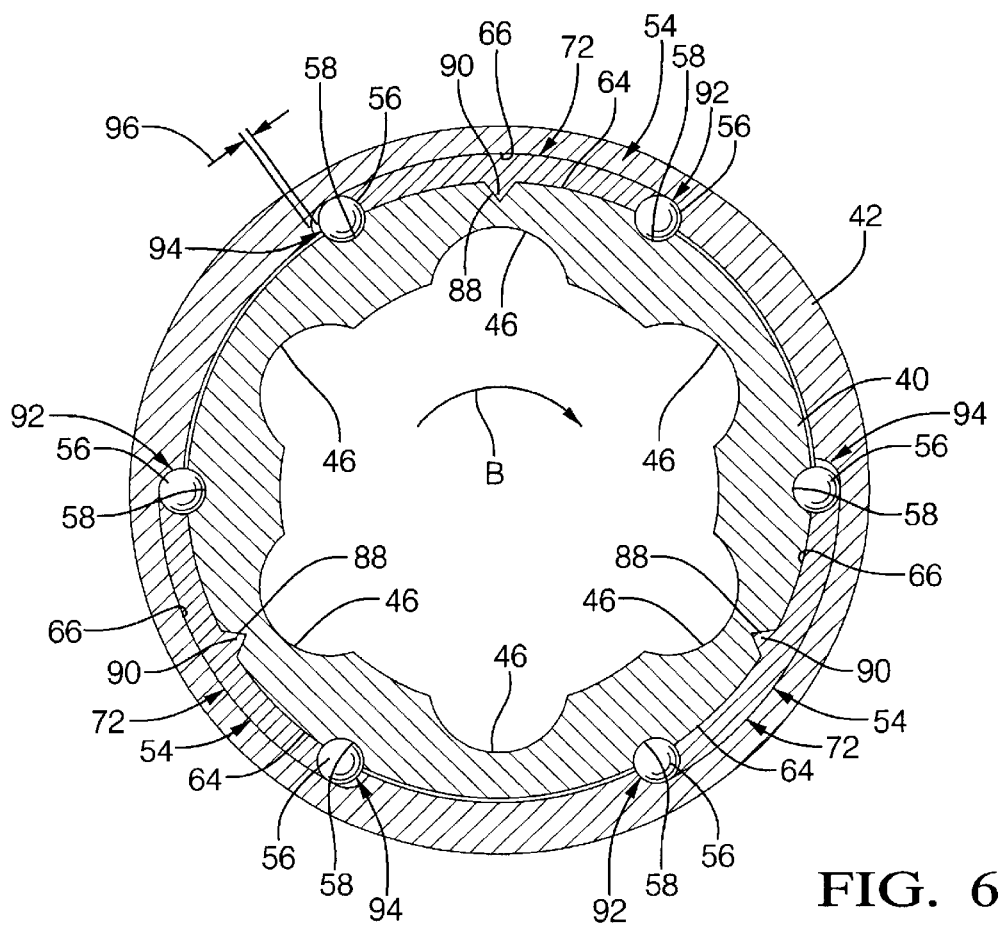
FIG. 6 is an enlarged schematic cross-sectional view taken through the intermediate and outer races generally along lines 6—6 of FIG. 4.
Figure 7:
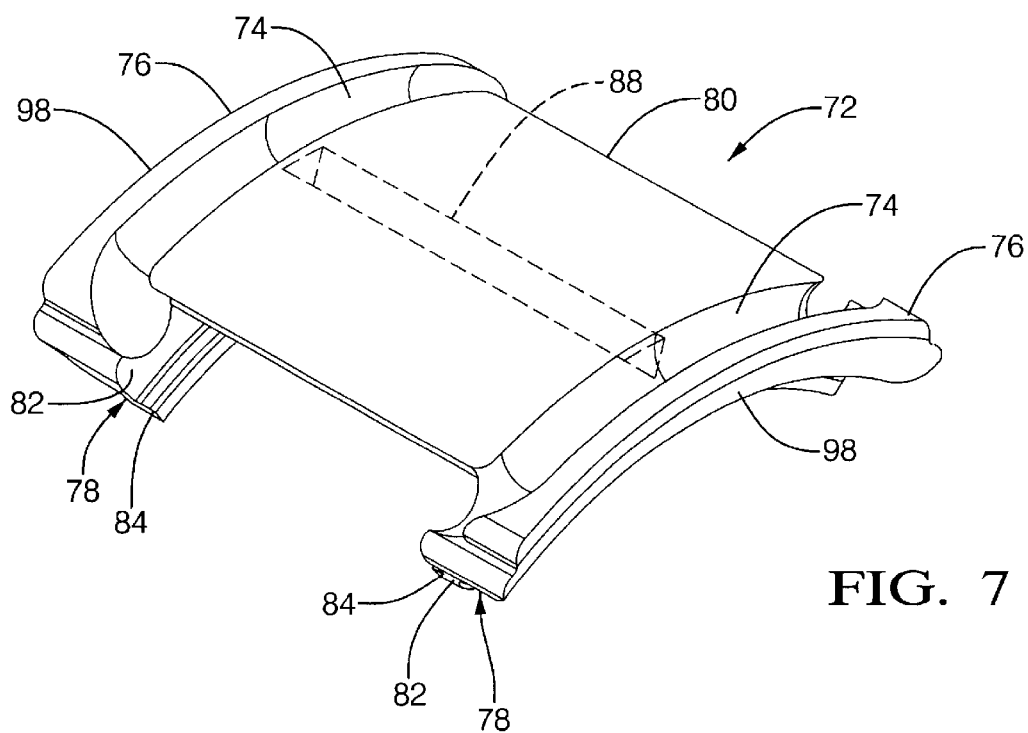
FIG. 7 is an enlarged perspective view of a channel extender component of the invention.

In the embodiment shown in FIG. 6, the intermediate race 40 is under a torque load in the direction of arrow B. The torque load applied in either direction acts to impart a load on one or the other axial runs of the spline balls 56 dependent, of course, on the direction of loading. Thus, each set of spline balls 56 within the respective recirculating ball spline tracks 54 will have a loaded axial run of spline balls 92 and an unloaded axial run of spline balls 94. Such loading of the spline balls 56, produces a clearance 96 on the unloaded side 94, allowing for free rolling of the spline balls along the unloaded axial run 94. While loaded, axial stroking movement of the intermediate race 40 relative to the outer race 42 will cause the spline balls 56 on the loaded side 92 to roll freely in the axial channel toward one end or the other, depending upon the direction of axial stroking. As the balls 56 of the loaded side 92 reach the end of the axial ball channels, they will be caused to enter the transverse ball channels 74 at one end of the intermediate race 40 while at the same time the balls circulate in opposite directions along the transverse ball channels 74 and in opposite directions along the axial ball channels of the loaded and unloaded sides 92,94 in a continuous movement, bringing another ball into the loaded side to replace the ball that exited at the opposite end. Such recirculating movement continues, with balls leaving and entering the loaded side 92 while recirculating through the transverse channels 74 and unloaded side 94, through the full stroke of the intermediate race 40 within the outer race 42.

The channel extenders 72 have axial free ends 98 which confront the end wall 68 at the axially inward end of the outer race 42 and a snap ring end stop 100 adjacent the opposite open end 70 of the outer race 42 mounted within a ring groove 102 and extending into the ball channels 66 to define, respectively, the axial limits of stroke of the intermediate race 40 within the outer race 42. The endless ball spline tracks 54 provide continuous free rolling movement of the spline balls 56 during the full range of movement of the intermediate race 40 between its axial stroke limits. As such, there is no skidding or sliding of the spline balls 56 within the channels.

It will be appreciated that additional channels extenders 72 could be provided through modification of the number and size of the ball channels formed in the intermediate race and outer race. For example, while the disclosed embodiment illustrates the use of three such channel extenders 72, it will be appreciated that four or six or more such extenders could be employed through appropriate modification in the size and location of the ball channels and extenders.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. A constant velocity stroking joint assembly comprising:
   an inner race;
   an outer race;
   an intermediate race disposed between said inner race and said outer race in coaxial alignment with said outer race, said intermediate race supporting said inner race for angular pivotal movement relative to said outer race; and
   at least one recirculating ball spline track provided between said intermediate race and said outer race and a plurality of spline balls accommodated therein for recirculating rolling movement in an endless path along said track for supporting said intermediate race for axial stroking movement relative to said outer race, said intermediate race having an outer surface formed with a plurality of axially extending circumferentially spaced ball channels, and said outer race having an inner surface formed with a plurality of axially extending ball channels aligned with said ball channels of said intermediate race, said intermediate race having opposite axial ends and said axial ball channels opening to said opposite ends, and including channel extenders coupled to said intermediate race adjacent said opposite ends of said intermediate race having transverse grooves formed therein extending between and interconnecting adjacent pairs of said axial channels of said intermediate race to define said endless path for said spline balls.

2. The assembly of claim 1 wherein said channel extenders are coupled with a snap-fit connection on said intermediate race.

3. The assembly of claim 1 wherein said channel extenders each include a pair of axially spaced channel portions having said transverse grooves formed therein and including coupling features engageable with said intermediate race for securing said channel portions to said opposite axial ends of said intermediate race.

4. The assembly of claim 3 wherein said channel extenders each include a body portion extending between and interconnecting said axially spaced channel portions.

5. The assembly of claim 4 wherein said body portion extends across said outer surface of said intermediate race and said channel portions are supported on said opposite axial ends of said intermediate race.

6. The assembly of claim 5 wherein said body portion projects radially outwardly of said intermediate race and is accommodated in an associated one of said ball channels of said outer race.

7. The assembly of claim 5 wherein said body portion has an inner surface formed with an axially extending alignment rib and said intermediate race includes axially extending alignment grooves formed between adjacent pairs of said ball channels and accommodating said alignment ribs of said channel extenders to orient and support said transverse grooves in operative communication with said axial ball channels of said intermediate race.

8. The assembly of claim 1 wherein said channel extenders include connecting portions that wrap around and extend beneath said opposite axial ends of said intermediate race for securing said channel extenders to said intermediate race.

9. The assembly of claim 1 wherein said channel extenders are fabricated of plastics material.

\* \* \* \* \*